April 14, 1959  G. L. N. MEYER  2,881,902
CASE CONVEYORS
Filed Oct. 30, 1953  4 Sheets-Sheet 1

INVENTOR.
George L. N. Meyer
BY
Eugene H. Simpson
Attorney

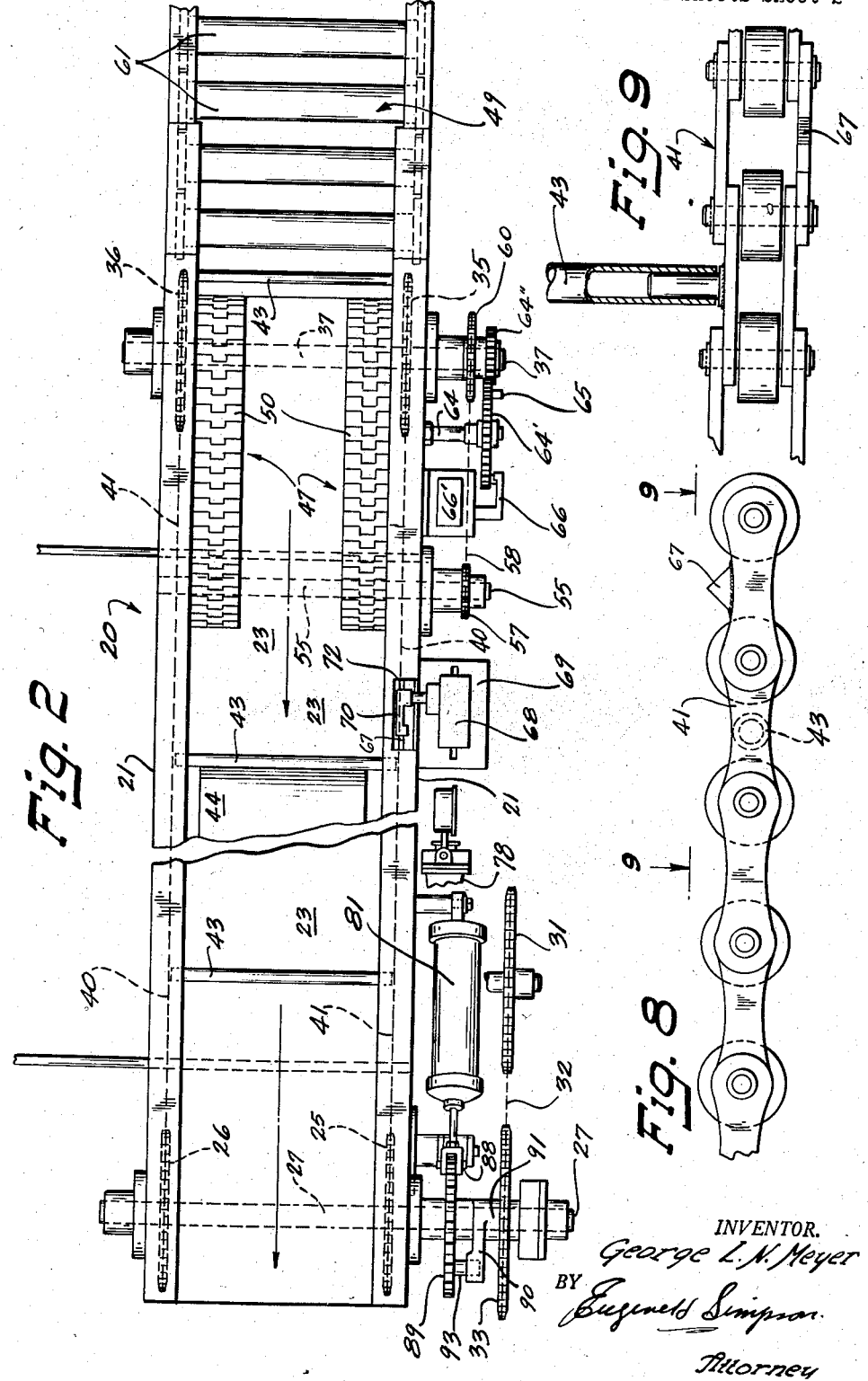

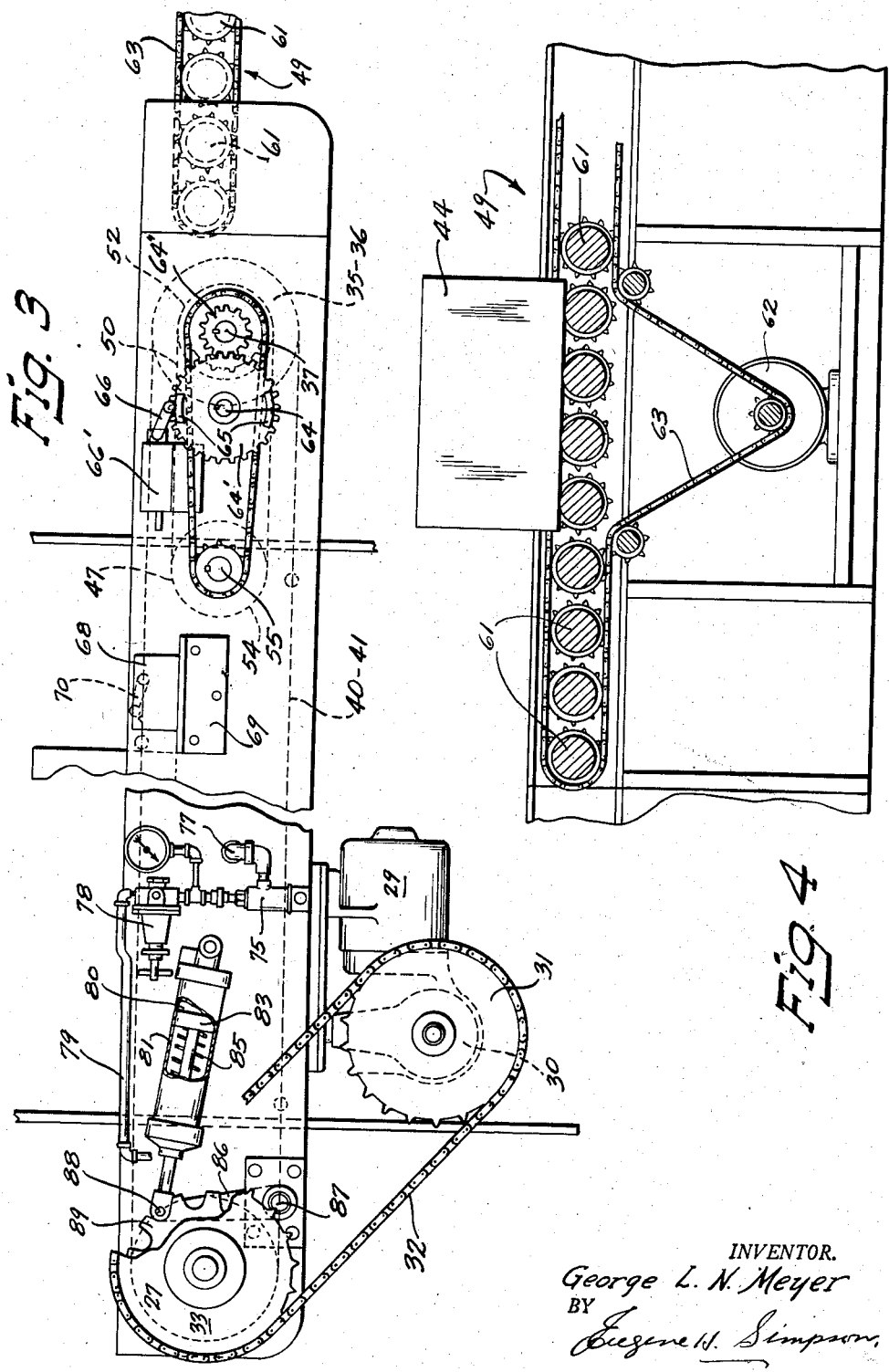

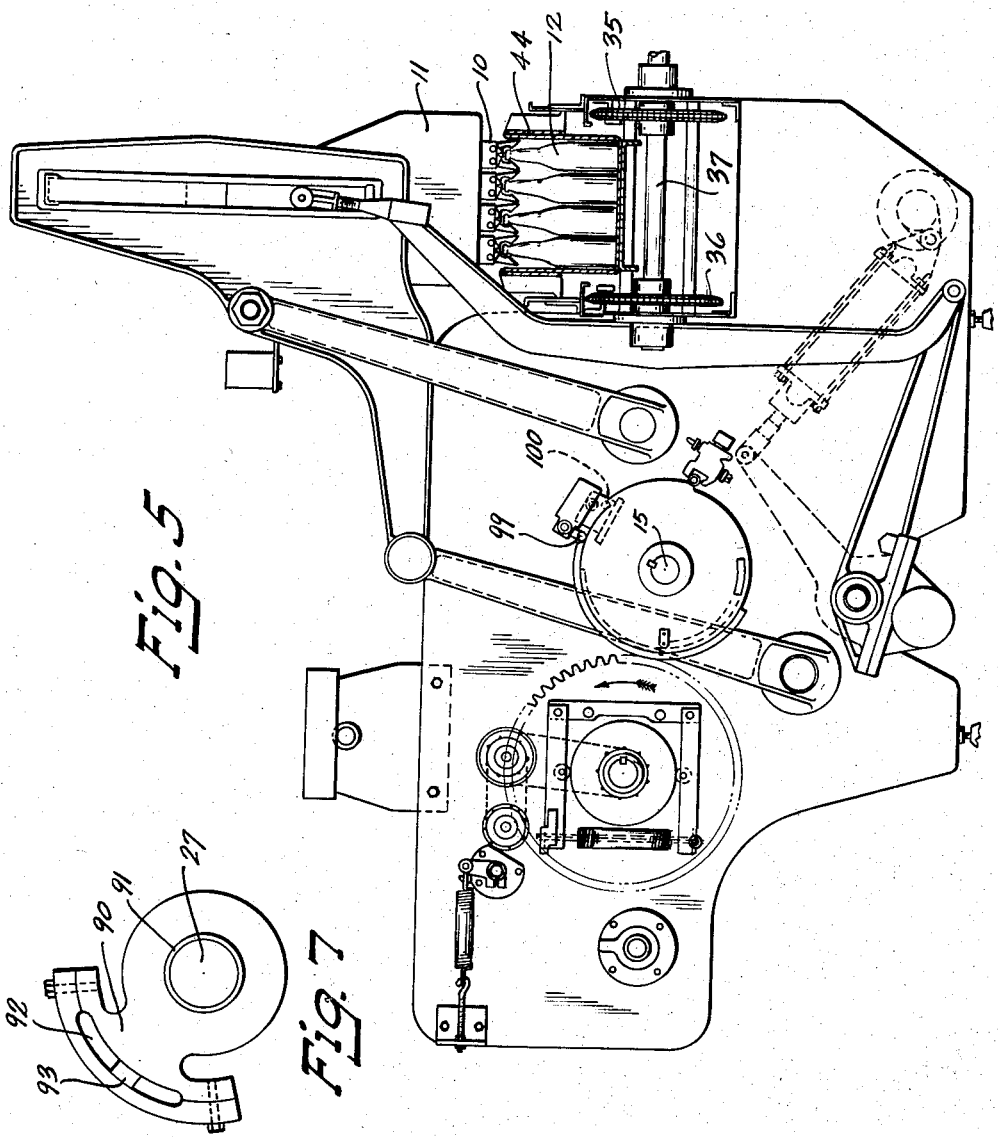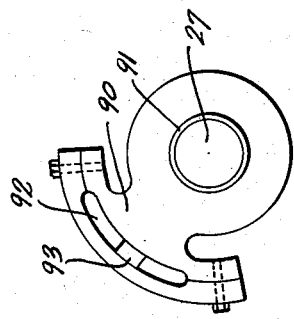

United States Patent Office 2,881,902
Patented Apr. 14, 1959

2,881,902

CASE CONVEYORS

George L. N. Meyer, Milwaukee, Wis., assignor to Geo. J. Meyer Manufacturing Company, Cudahy, Wis., a corporation of Wisconsin Application October 30, 1953, Serial No. 389,322

12 Claims. (Cl. 198—75)

This invention relates to case conveyors and more particularly to an improved timer for a bar conveyor adapted to move cases.

This application is an improvement on the case conveyor shown and described in an application Serial No. 230,110 filed June 6, 1951, now Patent No. 2,771,202 by George L. N. Meyer entitled "Case Unloader."

In case unloaders the bottles enter the machine packed in cases. In order to unload the cases and transfer the bottles from the case to a washing machine, or the like, it is essential that the case be stopped directly under the pick-up fingers of the unloading mechanism. In using a bar conveyor to transport the cases it is necessary to retime the cases entering the bar conveyor periodically in order that the bars may pass between the cases and move the latter into the desired position.

It is an object of the present invention to provide a bar conveyor which is synchronized with the case unloader to stop the cases directly under the pick-up fingers.

Another object is to provide a proper and uniform timing for an intermittently actuated bar conveyor.

Another object is to provide a bar conveyor with periodic retiming of the incoming cases.

Another object is to lock the case conveyor with the bottles directly under the pick-up fingers.

A further object is to provide a lock for a case conveyor which will release upon removal of the bottles from the case to permit continued movement of the conveyor.

A further object is to provide a case conveyor which will provide proper spacing for the entering cases.

A still further object is to provide a case conveyor the movement of which times the movement of a supply conveyor to deliver cases onto the former at proper intervals.

Still other objects will become apparent upon considering the following specification, which, when taken in conjunction with the accompanying drawings, illustrates a preferred form of the invention.

In the drawings:

Fig. 2 is a top plan view of the case conveyor shown in Fig. 1;

Fig. 3 is a front elevational view of the case conveyor per se;

Fig. 4 is a front elevational view of the roller conveyor used to supply cases to the conveyor shown in Fig. 3;

Fig. 5 is a side elevational view of one end of the case unloader, showing the lock control for the case conveyor;

Fig. 6 is a side elevational view of the cam used to actuate the case conveyor lock;

Fig. 7 is a front view of the lock sprocket drive element;

Fig. 8 is a side elevational view of the bar conveyor chain; and

Fig. 9 is a top plan view of the chain drive for the bar conveyor shown in Fig. 8.

Figure 1:
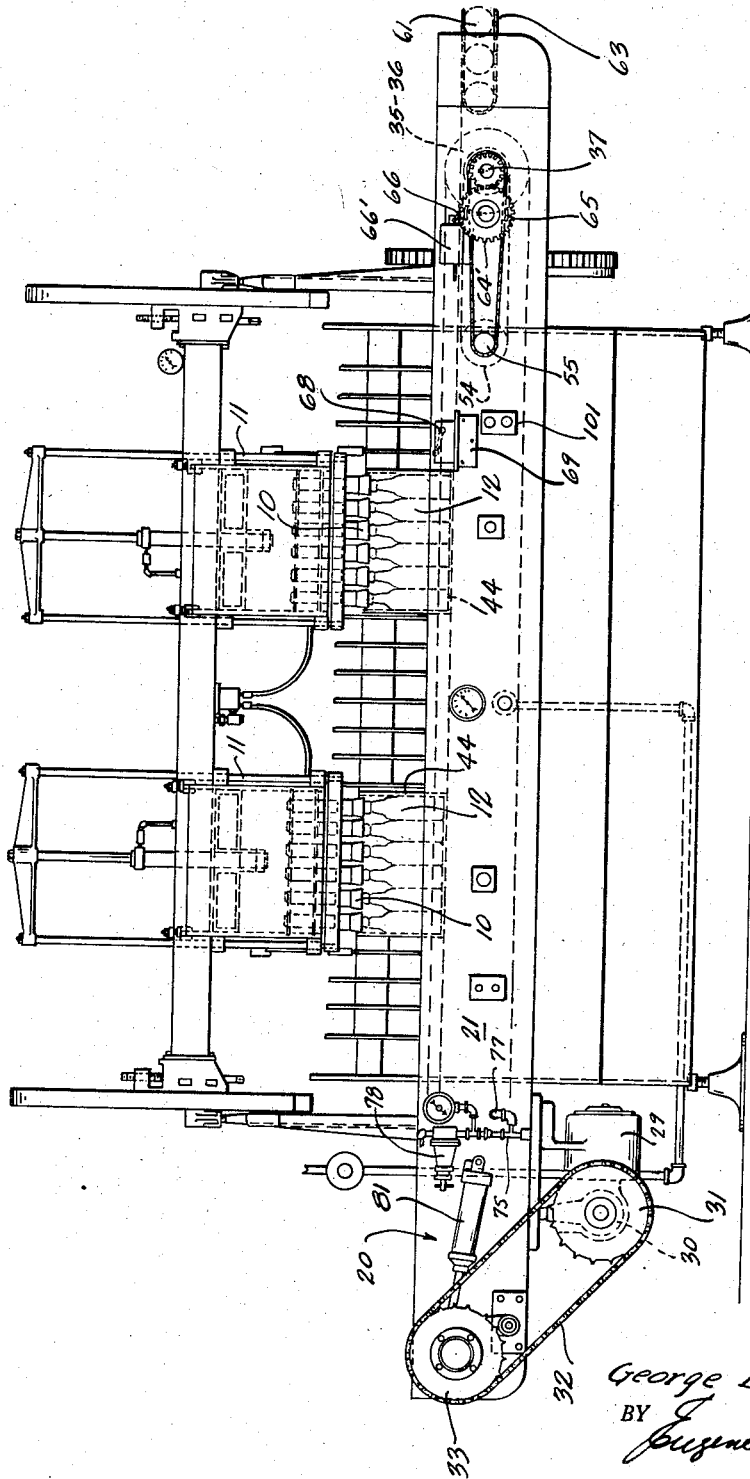
Fig. 1 is a front elevational view of a case unloader as shown in application Serial No. 230,110, showing the improved case conveyor.

Referring to the drawings, and particularly to Figs. 1 and 5, the case unloader, which is more fully described in application Serial No. 230,110 supra, has a plurality of pick-up fingers 10 which are arranged in a frame 11 in the identical positions corresponding to bottles in a case. The frames 11 are reciprocated vertically to grasp the bottles 12 and lift them from the case and are reciprocated horizontally to transfer the bottles from the case to the conveyor table (not shown).

The movement of the frames 11 is controlled through a shaft 15 so that one cycle of the frames occurs in one revolution of the shaft 15.

The case unloader may have any number of frames 11 depending on the capacity desired, two or three frames 11 being the usual number. For further details of the case unloader, see the aforesaid mentioned application Serial No. 230,110.

In order to transfer the cases of bottles to the case unloader, a bar conveyor, generally designated 20, is mounted on the front of the case unloader, so that the conveyor 20 is centered under the frames 11.

The conveyor 20 is built between a pair of channels 21—21. The channels are secured to the side plates of the case unloader. A flat plate 23 is mounted between the channels and forms a table over which the cases may slide.

A pair of sprocket wheels 25—26 are mounted on a shaft 27. The shaft 27 is journalled between the channels 21—21 at the discharge end of the conveyor. The shaft 27 is driven from a brake motor 29 through a reduction gearing 30 and a chain and sprocket drive 31, 32, 33.

A second pair of sprockets 35—36 is mounted on a shaft 37, the shaft 37 being journalled between the channels 21—21 at the opposite end thereof from the shaft 27.

The sprockets 25—26 and 35—36 drive endless chains 40—41. The chains 40—41 are supported above the table 23 and have bars or rods 43 mounted between the chains so that the bars, too, are spaced from the top of the table 23. The bars 43 form a pusher conveyor for cases, such as 44, which are pushed by the bars 43 over the surface of the table 23.

A feed-in conveyor 47 feeds the cases from a supply or roller conveyor 49 to the bar conveyor 43. The feed-in conveyor 47 comprises a pair of parallel plate chains 50—50 which receive the cases 44 from the supply conveyor 49 and impart further movement to the cases until such time as the cases are in position to be moved into place under the pick-up fingers 10 by the bars 43.

The plate chains 50—50 are carried between sprockets 52—52 mounted on the shaft 37 and similar sprockets 54—54 carried on a shaft 55. The shaft 55 is mounted between the channels 21 and is driven from the shaft 37 through a sprocket 57, a chain 58, and a sprocket 60, the sprocket 60 being mounted on the shaft 37 and driven thereby.

It will be noted that the top of the plate chains 50—50 is substantially the same level as the top of the table 23 and that the diameter of the sprockets 35—36 is greater than that of the sprockets 52—52 so that the rods 43 pass upwardly around the end of the chain 50 and move forward above the top of the chain 50 to engage the end of a case 44.

The supply conveyor 49 comprises a plurality of rollers 61 (Fig. 4), positively driven from a brake motor 62 through a continuous chain 63.

It is necessary to control the movement of the cases 44 entering the conveyor 20 in order that the bars 43 may pass upwardly around the sprockets 35—36 at the entering end of the conveyor 20 and rise into case engaging position at the rear of the case. To accomplish this result a stub shaft 64 is mounted on the outside of the channel 21 and carries a gear 64' freely rotatable thereon. The gear 64' is driven by a mating gear 64" fixed on the outer end of the shaft 37.

The gear 64' contains cam surfaces 65—65 which are engaged by a contact arm 66 of a micro-switch 66' so that as the bar 43 rises around the ends of the sprockets 35—36 the actuating arm 66 contacts the cam surfaces 65 to actuate the switch 66' and shut off the current to the brake motor 62. Stopping the current to the motor 62 stops the conveyor 49 and the cases 44 thereon, while permitting the continuous movement of the plate conveyor 47 and the case on it. This stopping of the conveyor 49 and continuous movement of the case on the conveyor 47 permits the bar 43 to rise in back of the case 44, being carried by the conveyor 47, and to push the case along the table 23 to a position directly under the fingers 10.

In the present invention it is necessary to stop the case 44 directly under the pick-up fingers 10 so that the latter may reach down into the case, grip the necks of the bottles and remove the bottles from the case, after which the empty case is moved forward and off the machine.

To stop the conveyor 20, appropriate links of the chain 41 are provided with upwardly extending cam surfaces 67 (Figs. 8 and 9). A micro-switch 68 is mounted on a bracket 69 on the outer channel 21. The micro-switch 68 has an actuating arm 70 which projects through an aperture 72 cut in the channel 21 so that when the cam 67 passes under the arm 70, the arm is raised to throw the switch and cut off the current to the brake motor 29.

At the same time actuation of the switch 68 opens a solenoid valve 75, permitting air from a pressure tank (not shown) to flow through the line 77, past the valve 75, through a pressure regulator 78, through a pipe 79 and to enter the lower end 80 of a cylinder 81. The air in the lower end of the cylinder 81 forces a piston 83 forward against the action of a spring 85.

As the piston 83 moves forward it rotates a lever 86 about a stationary pivot 87 forcing a stop roll 88 into an appropriate recess in a sprocket wheel 89 to stop the bar conveyor 43 accurately in position with the cases alined under the pick-up fingers 10. In entering the recess in the sprocket wheel 89 the stop roll 88 may turn the sprocket wheel slightly to make the exact adjustment to the bar conveyor 43 and center the bottles precisely under the pick-up fingers.

The sprocket wheel 89 is adjustably mounted on the shaft 27 by an arm 90 (Fig. 7) having a hub 91 fixed to the sprocket 33 and to the shaft 27. The arm 90 has an arcuate slot 92 which is adapted to receive a finger 93 on the sprocket wheel 89, and retain the sprocket wheels 33 and 89 in their relatively correct positions.

As the case unloader operates, the shaft 15 rotates continuously making one revolution for each cycle of the case unloader. The shaft 15 carries a cam wheel 95 containing a cam surface 97. As the bottles in the cases rise to a point where the bottoms of the bottles clear the tops of the cases the cam surface 97 passes under a micro-switch 99 which is actuated to release air pressure from beneath the piston 83 and permit the spring 85 to move toward the bottom of the cylinder 81 and remove the stop roll 88 from the sprocket wheel 89. When the stop roll is out of engagement with the sprocket wheel a second micro-switch 100 is engaged by the cam 97 to restart the motor 29 and permit the bar conveyor 43 to advance and discharge the empty cases off the end of the conveyor 20 and permit loaded cases to enter from the conveyor 49 onto the conveyors 47 and 20.

Operation

In operation the air supply is turned onto the supply pipe 77 and the electricity is connected through a switch 101 to the machine. If the actuating arm 66 of the micro-switch 66' is not on a cam surface 65 the operation of the switch 101 will supply current both to the motor 29 and to the motor 62 as well as to the motor, not shown, which actuates the pick-up fingers 10. Actuation of the motor 29 propels the bars 43 intermittently, in spaced relation to the table 23, between the sprockets 25—26 and the sprockets 35—36. Rotation of the motor 62 propels the cases 44 forward toward the plate conveyor 50 which receives one case 44 and moves it forward independently of the conveyor 49.

The timing of the conveyor is such that as the end of the case moves off the conveyor 49 its movement is continued by the plate conveyor 50 at which time a bar 43 is moving upwardly around the sprockets 35—36. At this time the gear 64' has been rotated by the shaft 37 to a point where a cam 65 engages the actuating arm 66 of the micro-switch 66' to stop the motor 62 and prevent the movement of a second case onto the plate conveyor 50, permitting the bar 43 to rise in back of the case which is being advanced by the plate conveyor 50 and to move the case off the conveyor 50 onto and along the table 23.

As soon as the bar 43 rises above the surface of the table 23 the actuating arm 66 of the micro-switch 66' drops off the cam 65 to allow restarting of the motor 62 to advance a second case 44 onto the plate conveyor 50.

When the cases advance to their correct position under the fingers 10 the actuating arm 70 of the micro-switch 68 contacts the cam surface 67 on the chain 41 to shut off current to the brake motor 29, stop that motor and open the solenoid valve 75 to permit air under pressure to enter the bottom 80 of the cylinder 81. The air pressure in the cylinder 81 forces the piston 83 outward against the compression of the spring 85 and forces the stop roll 88 into engagement with the correct opening in the sprocket wheel 89 to stop the case precisely at the correct position under the fingers 10.

When the bar conveyor 43 stops, the roller conveyor continues to operate, advancing all the cases thereon until the leading case contacts the rear of the bar conveyor 43 and the following cases are in close contact with each other. This stopping of the bar conveyor periodically provides proper timing for the cases entering the conveyor and retiming every two or three cases.

After the frames 11 have lowered and the fingers 10 have grasped the necks of the bottles the frames 11 rise and withdraw the bottles from the cases.

When the bottles are raised from the cases the cam 97 (Fig. 6) contacts the micro-switch 99 to release air from the bottom of the cylinder 81 and withdraw the stop roll 88 from the sprocket wheel 89. When this occurs the cam 97 contacts the second micro-switch 100 to restart the motor 29 to discharge the empty cases from the conveyor 20 and bring in loaded cases from the conveyor 49.

It will be realized that the hereinbefore described form of the invention is to be taken merely as a preferred example thereof, and various changes in size, shape and arrangement of parts may be resorted to without departing from the spirit of the invention or the scope of the sub-joined claims.

That which is claimed as new and is desired to be secured by United States Letters Patent is:

1. In a case conveyor of the character described, a bar conveyor, a power driven roller conveyor adapted to feed cases into said bar conveyor, means to stop the roller conveyor to permit the bar conveyor to pass between the cases and engage the end of a case, and means to stop the bar conveyor periodically to permit cases to abut the backs of the bars to retime the cases entering the bar conveyor.

2. In a case conveyor, or the like, a table adapted to receive cases in sliding engagement, a feed conveyor adapted to move cases toward said table, a bar conveyor comprising a plurality of spaced bars movable above said table to convey cases across the table, a power driven supply conveyor adapted to supply cases to said feed conveyor, means to stop the supply conveyor to permit the passage of a bar between the cases and to reactivate the supply conveyor when the bar conveyor is in position to engage the rear of a case, and means to stop the bar conveyor periodically to permit a case to abut a conveyor bar to retime the cases on the supply conveyor.

3. In a case conveyor, or the like, a table adapted to receive cases in sliding engagement, a feed conveyor adapted to move cases toward said table, a bar conveyor comprising a plurality of spaced bars movable above said table to convey cases across the table, a supply conveyor adapted to supply cases to said feed conveyor, means to stop the supply conveyor to permit the passage of a bar between the cases and to reactivate the supply conveyor when the bar conveyor is in position to engage the rear of a case, and means to stop the bar conveyor and the feed conveyor periodically to permit a case to abut a conveyor bar to retime the cases on the supply conveyor.

4. In a case conveyor, or the like, a table adapted to receive cases in sliding engagement, a bar conveyor supported above said table to move the cases over the table, a power driven supply conveyor to supply cases to said bar conveyor, means to stop the supply conveyor to permit passage of the bar conveyor between the cases to engage the rear of a case, and means to retime the cases on the supply conveyor periodically.

5. In a case conveyor, or the like, comprising a stationary table adapted to receive cases in sliding engagement therewith, a bar conveyor engageable with a case to move the same, means to stop and lock the bar conveyor in a desired position to stop the movement of the case, and means operable after a predetermined period of time to release the lock to permit the bar conveyor to continue movement.

6. A case conveyor comprising, a stationary table, a bar conveyor comprising parallel movable chains, a plurality of bars joining said chains at spaced intervals and means to move said chains simultaneously to advance the bars, said bar conveyor being adapted to move cases across the table, means to load cases onto said table between the bars, means to stop and lock the bar conveyor with a case in a desired position, and means operable after a predetermined period of time to release the lock to permit the bar conveyor to move the cases off the table.

7. In a case conveyor system, a first conveyor adapted to receive cases of bottles, or the like, and to transport the cases to a desired position, means to stop the conveyor with one case in the desired position, means to lock the conveyor in the desired position, means operable after a predetermined period of time to release the lock means, and means operable subsequent to the release of the lock means to restart the conveyor.

8. A case conveyor comprising, a stationary table, a bar conveyor including a plurality of bars movable longitudinally of said table and in spaced relation to the top thereof, means to actuate said bar conveyor, a bar of said conveyor being adapted to engage the end of a case to move the latter over the table, means to deliver a case to said table ahead of said bar in position to be engaged thereby, means to stop the bar conveyor in a desired position, means to lock the bar conveyor against movement from the desired position, means to release said bar at a desired time, and means to reactivate said first named means to continue movement of the case.

9. A case conveyor comprising, a stationary table, a bar conveyor including a plurality of bars movable longitudinally of said table and in spaced relation to the top thereof, means to actuate said bar conveyor, a bar of said conveyor being adapted to engage the end of a case to move the latter over the table, means to deliver a case to said table ahead of said bar in position to be engaged thereby, means to stop the bar conveyor in a desired position, a pneumatically operated lock to positively retain said bar conveyor in the desired position, means to release the lock to permit further movement of the case, and means to reactivate said first named means subsequent to the release of the last named means.

10. In a case conveyor, or the like, a table, a bar conveyor including a plurality of bars adapted to move cases over the said table, a feed-in conveyor adapted to move the cases onto the table ahead of the bars, a power driven roller conveyor to supply cases to the feed-in conveyor, means to stop the roller conveyor periodically to permit a bar to pass between adjacent cases being fed onto the feed-in conveyor, means to stop the bar conveyor with the cases being moved thereby in a desired position and to continue the movement of the roller conveyor to permit following cases to abut each other and thus retime the cases entering the bar conveyor.

11. In a case conveyor, or the like, a table, a bar conveyor including a plurality of bars adapted to move cases over the said table, a feed-in conveyor adapted to move the cases onto the table ahead of the bars, a power driven roller conveyor to supply cases to the feed-in conveyor, means to periodically stop the roller conveyor to permit a bar to pass between adjacent cases being fed onto the feed-in conveyor, means to stop the bar conveyor with the cases being moved thereby in a desired position, means to lock the bar conveyor against further movement in said position, and to continue the movement of the roller conveyor to permit following cases to abut each other and thus retime the cases entering the bar conveyor.

12. In a case conveyor, or the like, a table, a bar conveyor including a plurality of bars adapted to move cases over the said table, a feed-in conveyor adapted to move the cases onto the table ahead of the bars, a roller conveyor to supply cases to the feed-in conveyor, means to periodically stop the roller conveyor to permit a bar to pass between adjacent cases being fed on to the feed-in conveyor, means to stop the bar conveyor with the cases being moved thereby in a desired position, means to lock the bar conveyor against further movement in said position, and to continue the movement of the roller conveyor to permit following cases to abut each other and thus retime the cases entering the bar conveyor, and means to release the locking means to restart the bar conveyor at a predetermined time.

References Cited in the file of this patent

UNITED STATES PATENTS

| | | |
|---|---|---|
| 2,546,281 | Talbot | Mar. 27, 1951 |
| 2,635,773 | Ardell | Apr. 21, 1953 |
| 2,656,060 | Fischer et al. | Oct. 20, 1953 |